US010981359B2

(12) United States Patent
Bauerle et al.

(10) Patent No.: US 10,981,359 B2
(45) Date of Patent: Apr. 20, 2021

(54) LAMINATED GLAZING COMPRISING A LIGHT LIGHT-EMITTING DIODE

(71) Applicant: SAINT-GOBAIN GLASS FRANCE, Courbevoie (FR)

(72) Inventors: Pascal Bauerle, Roye (FR); Alexandre Hennion, Venette (FR); Nicolas Coutellier, Thourotte (FR); Christophe Kleo, Attichy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/089,861

(22) PCT Filed: Mar. 23, 2017

(86) PCT No.: PCT/FR2017/050678
§ 371 (c)(1),
(2) Date: Sep. 28, 2018

(87) PCT Pub. No.: WO2017/168077
PCT Pub. Date: Oct. 5, 2017

(65) Prior Publication Data
US 2019/0143648 A1 May 16, 2019

(30) Foreign Application Priority Data

Mar. 31, 2016 (FR) ...................... 1652804

(51) Int. Cl.
*B32B 17/10* (2006.01)
*B60J 1/00* (2006.01)
(Continued)

(52) U.S. Cl.
CPC .. *B32B 17/10541* (2013.01); *B32B 17/10036* (2013.01); *B60J 1/004* (2013.01);
(Continued)

(58) Field of Classification Search
CPC ....... B32B 17/10541; B60J 10/70; B60Q 3/64
See application file for complete search history.

(56) References Cited

U.S. PATENT DOCUMENTS

2011/0267833 A1* 11/2011 Verrat-Debailleul .......................
B32B 17/10036
362/545
2012/0104790 A1 5/2012 Plavetich et al.
(Continued)

FOREIGN PATENT DOCUMENTS

FR 2 978 379 A1 2/2013
WO WO 2010/049638 A1 5/2010
WO WO 2013/121134 A1 8/2013

OTHER PUBLICATIONS

International Search Report as issued in International Patent Application No. PCT/FR2017/050678, dated Jun. 12, 2017.

*Primary Examiner* — Mathew J. Peerce
(74) *Attorney, Agent, or Firm* — Pillsbury Winthrop Shaw Pittman LLP

(57) ABSTRACT

A glazing, and in particular an automotive glazing, includes a laminated glazed element including an exterior glass sheet, an interior glass sheet and a plastic interlayer sheet that is located between the two glass sheets and including at least one light-emitting diode that is located under a peripheral edge of the interlayer face of the exterior glass sheet, wherein the emitting face of the light-emitting diode is located facing at least a part of the edge face of the interior glass sheet and wherein the glazing includes a profiled bead including an exterior lip an interior lip and a body, with the body being located a distance away from, and not in contact with, the emitting face of the light-emitting diode.

15 Claims, 1 Drawing Sheet

Figure 1:
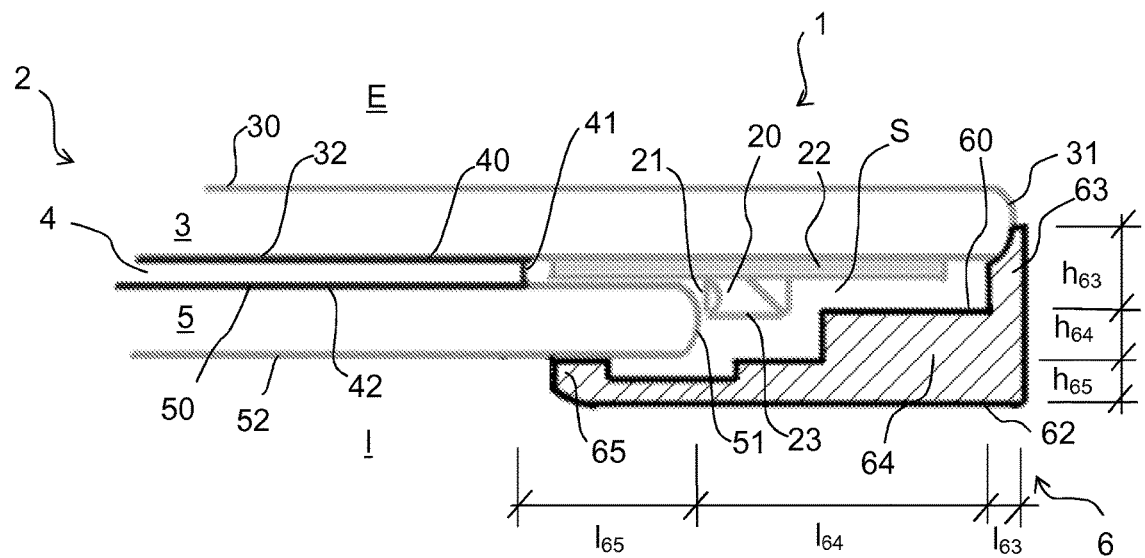

(51) Int. Cl.
*B60Q 3/64* (2017.01)
*B60Q 3/208* (2017.01)
*B60J 10/70* (2016.01)

(52) U.S. Cl.
CPC .............. *B60J 10/70* (2016.02); *B60Q 3/208* (2017.02); *B60Q 3/64* (2017.02)

(56) References Cited

U.S. PATENT DOCUMENTS

2012/0320621 A1* 12/2012 Kleo ................ B32B 17/10018
362/558
2014/0204601 A1 7/2014 Bauerle et al.
2014/0362597 A1* 12/2014 Verrat-Debailleul ........................
B60Q 1/268
362/511

* cited by examiner

LAMINATED GLAZING COMPRISING A LIGHT LIGHT-EMITTING DIODE

CROSS-REFERENCE TO RELATED APPLICATIONS

This application is the U.S. National Stage of PCT/FR2017/050678, filed Mar. 23, 2017, which in turn claims priority to French patent application number 1652804 filed Mar. 31, 2016. The content of these applications are incorporated herein by reference in their entireties.

The present invention relates to a glazing, and in particular an automotive glazing, comprising a laminated glazed element comprising an exterior glass sheet, an interior glass sheet and a plastic interlayer sheet that is located between said two glass sheets.

Just like any laminated glazed element:
the exterior glass sheet has an exterior face, an edge face and an interlayer face that is oriented toward the plastic interlayer sheet,
the interior glass sheet has an interlayer face that is oriented toward the plastic interlayer sheet, an edge face and an interior face.

The glazing according to the invention includes at least one light-emitting diode located under a peripheral edge of said interlayer face of said exterior glass sheet and that has an emitting face located facing at least a part of said edge face of said interior glass sheet.

Such a light-emitting diode allows a lighting system to be produced, said system being integrated into the glazing; thus, positioning the glazing into the window aperture that it must close simultaneously positions the lighting system and it is therefore no longer necessary to make provision for a step of installing a lighting system in parallel to the step of positioning the glazing in the window aperture.

This is particularly advantageous for automotive glazings because it means there is no need to make provision for a step of installing a lighting system into the vehicle on the general vehicle assembly line.

A glazing including a light-emitting diode located under a peripheral edge of the interlayer face of the exterior glass sheet is in particular known from FIG. 15 of the international patent application No. WO 2010/049638 or even from FIG. 5 of international patent application No. WO 2013/121134.

In these glazings, the light-emitting diode includes an emitting face located in proximity to the edge face of the interior glass sheet with interposition of a transparent internal sealing adhesive or glue between the emitting face and the edge face of the interior glass sheet; the emitting face is therefore not facing, i.e. opposite, the edge face of the interior glass sheet since it is facing the transparent internal sealing adhesive (or glue) that itself faces the edge face of the interior glass sheet.

These glazings are a satisfactory solution as regards the positioning of the light-emitting diode, but they could be improved insofar as the transparent internal sealing adhesive (or glue) which allows the light-emitting diode to be positioned and that is located between the light-emitting diode and the edge face of the interior glass sheet may lose its ability to maintain the diode in position over time, in particular under the effect of climatic cycles.

For this internal sealing adhesive (this glue), it is possible to use a material that is more resistant to ageing but it is then more expensive and less transparent.

The aim of the present invention is to remedy the drawbacks of the prior art by providing a glazing including at least one light-emitting diode that is protected by a jacket that does not unfavorably affect the light-emitting diode and the lighting system thus formed, or in any case that has fewer unfavorable effects on the light-emitting diode and on the lighting system thus formed.

Furthermore, the aim of the present invention is to remedy the drawbacks of the prior art by providing a glazing including at least one light-emitting diode that has a high resistance to ageing and that is inexpensive to manufacture.

The present invention thus relates to a glazing as claimed in claim 1. The dependent claims present additional advantageous features.

This glazing may in particular be an automotive glazing and it comprises a laminated glazed element comprising an exterior glass sheet, an interior glass sheet and a plastic interlayer sheet located between (in direct contact or with interposition of another plastic sheet) said two glass sheets,
said exterior glass sheet having an exterior face, an edge face and an interlayer face that is oriented toward said plastic interlayer sheet,
said interior glass sheet having an interlayer face that is oriented toward said plastic interlayer sheet, an edge face and an interior face.

This glazing furthermore includes at least one light-emitting diode located under a peripheral edge of said interlayer face of said exterior glass sheet and having an emitting face.

This glazing is noteworthy in that said emitting face is located facing at least a part of said edge face of said interior glass sheet and in that it includes a profiled bead including:
an exterior lip in contact with said peripheral edge of said interlayer face of said exterior glass sheet and/or said edge face of said exterior glass sheet,
an interior lip in contact with a peripheral edge of said interior face of said interior glass sheet, and
a body located between said exterior lip and said interior lip,
with said body being located a distance away from said emitting face of the light-emitting diode and not in contact with said emitting face, and preferably furthermore being located a distance away from, and not in contact with, said edge face of said interior glass sheet.

The emitting face of said light-emitting diode is therefore adjacent to the edge face of said interior glass sheet (i.e. in proximity to this edge face) while being very exactly facing, i.e. directly opposite, this edge face, no solid material being interposed between the emitting face of said light-emitting diode and the edge face of said interior glass sheet.

Thus, the light-emitting diode is protected by the profiled bead but there is no organic profiled-bead material at the interface between the emitting face of the light-emitting diode and the adjacent edge face of the interior glass sheet i.e. the edge face via which the light emitted by the light-emitting diode penetrates into this interior glass sheet: the light-emitting diode emits light directly toward the edge face of the interior glass sheet since there is no solid material (and therefore no light loss) between the emitting face and the facing edge face; said profiled bead then forms a protective jacket that protects the emitting face of the light-emitting diode, but the drawbacks caused in the prior art, and in particular in the glazings of patent applications Nos. WO 2010/049638 and WO 2013/121134 presented above, by the ageing of the organic material of the transparent internal sealing adhesive or glue at the interface, i.e. of the adhesive or glue located between the emitting face of the light-emitting diode and the adjacent edge face of the interior glass sheet, are thus avoided.

Furthermore, said body may be located a distance away from said light-emitting diode and not make contact with this light-emitting diode; thus, a space devoid of solid material is preferably created between said light-emitting diode and said profiled bead, which then forms a protective jacket that protects said light-emitting diodes while remaining a distance away from this light-emitting diode and that thus runs no risk of unfavorably affecting the light-emitting diode and the lighting system thus formed.

The protective jacket formed by the profiled bead makes:
  contact with said peripheral edge of said interlayer face of said exterior glass sheet and/or said edge face of said exterior glass sheet by virtue of the exterior lip, and
  makes contact with a peripheral edge of said interior face of said interior glass sheet by virtue of the interior lip.

In a completely surprising way, it has thus been discovered that such a space devoid of solid material increases the insulation of the protective jacket with respect to the heat given off by the light-emitting diode.

Thus, the glazing according to the invention does not include the presence of a transparent internal sealing adhesive between the light-emitting diode and the edge face of the interior glass sheet.

The material of said profiled bead is preferably chosen to be opaque and thus is less liable to undergo changes with ageing.

Preferably, said interior lip does not lie against said edge face of said interior glass sheet in order not to hinder the transmission of light via this edge face. Specifically, it has been discovered that the profiled bead is able to play its protective role without it being necessary for said interior lip to lie against said edge face of said interior glass sheet.

In one variant, said interior lip makes contact with said peripheral edge of said interior face of said interior glass sheet over only a part of its length.

Said exterior lip preferably has a width comprised between 1.0 and 3.0 mm and a height comprised between 1.0 and 5.0 mm.

Said interior lip preferably has a width comprised between 1.0 and 10.0 mm and a height comprised between 1.0 and 3.0 mm.

Said light-emitting diode is preferably attached to said peripheral edge of said interlayer face of said exterior glass sheet by means of an adhesive layer, said body being located a distance away from, and not in contact with, said adhesive layer and said exterior lip furthermore preferably being located a distance away from, and not in contact with, said adhesive layer. This adhesive layer is then present only on this interlayer face of said exterior glass sheet because it is not necessary for it to be present between the emitting face of the light-emitting diode and the edge face of the interior glass sheet.

In a completely surprising way, it has furthermore been discovered that such a space devoid of solid material then forms a primary protective jacket and allows an additional protective profile, which is located closer to the interior than said profiled bead, to be provided.

The glazing according to the invention may thus furthermore include an additional protective profile that at least partially, and preferably completely, covers an interior face of said profiled bead, namely the face furthest away from said light-emitting diode.

The present invention moreover relates to a process for manufacturing the glazing according to the invention, wherein said profiled bead is positioned, by extruding a constituent material of said profiled bead, with said body located a distance away from, and not in contact with, said light-emitting diode, and preferably furthermore is located a distance away from, and not in contact with, said edge face of said interior glass sheet. Producing the profiled bead by extrusion is particularly advantageous because it allows the absence of contact to be achieved simply, reliably and inexpensively. It is more complex to produce the profiled bead by encapsulation for example, because of the absence of contact.

Preferably, furthermore, an additional protective profile is manufactured by encapsulating said profiled bead, i.e. by molding the additional protective profile on the profiled bead (on the interior face of this profiled bead). Producing the additional protective profile by encapsulation is particularly advantageous because it allows a durable level of protection to be achieved. Producing the additional protective profile by extruding for example is certainly simpler, but achieves a less durable level of protection.

Advantageously, the present invention allows a glazing comprising one (or more than one) light-emitting diode(s) to be provided, in which glazing this (or these) diode(s) is (are) protected by a profiled bead that does not make contact therewith.

Furthermore, the present invention allows such a glazing to be provided, in which glazing the profiled bead is protected by an additional protective profile.

The present invention thus allows a reliable and inexpensive lighting system to be produced.

Figure 2:
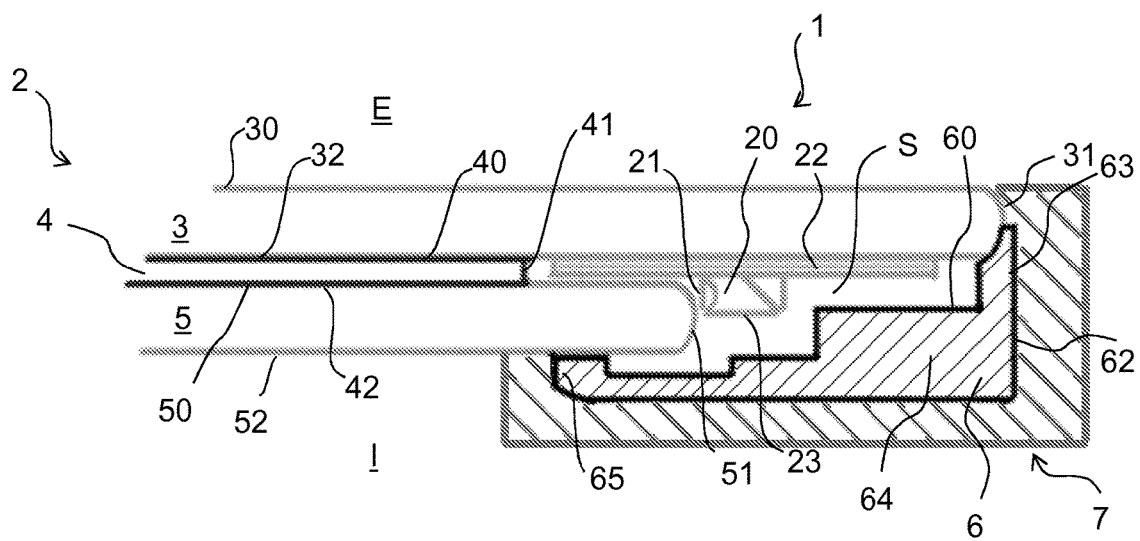

A plurality of forms of execution of the present invention will be described below, by way of nonlimiting example, with reference to the appended drawings, in which:

FIG. 1 is a cross-sectional view of a first embodiment of a glazing according to the invention; and FIG. 2 is a cross-sectional view of a second embodiment of a glazing according to the invention.

For the sake of readability, in each figure the various elements are to scale and elements of secondary importance have in general not been shown. In the two figures, the same references have been used to reference the same elements.

The present invention relates to a glazing 1, such as partially shown in FIG. 1 and in FIG. 2, comprising a laminated glazed element 2 comprising an exterior glass sheet 3, an interior glass sheet 5 and a plastic interlayer sheet 4 located between said two glass sheets.

The present invention is described by way of example in the context of an application as an automotive glazing, this glazing separating an exterior space E that is outside the vehicle and an interior space I that is inside the vehicle. The notions of "exterior" and "interior" are therefore to be considered with respect to this exterior space E and this interior space I, respectively.

The application of the present invention to a vehicle roof glazing and more precisely an application to a right-hand edge of a vehicle roof glazing (as may be seen in FIGS. 1 and 2) is in particular described, FIGS. 1 and 2 each being a partial vertical cross-sectional view of the glazing 1 before installation in a coachwork window aperture.

The glazed element 2 of the glazing 1 is necessarily a laminated glazing that includes, from the exterior to the interior, at least: the exterior glass sheet 3, the plastic interlayer sheet 4 and the interior glass sheet 5; however, it is possible that at least one other sheet be intermediate between the exterior glass sheet 3 and the plastic interlayer sheet 4 or between the plastic interlayer sheet 4 and the interior glass sheet 5.

The exterior glass sheet 3 has an exterior face 30 that is oriented toward the exterior E, an interlayer face 32 that is oriented toward the plastic interlayer sheet 4, and an edge face 31 that is located between these two faces.

The interior glass sheet 5 has an interlayer face 50 that is oriented toward the plastic interlayer sheet 4, an interior face 52 that is oriented toward the interior I and an edge face 51 that is located between these two faces.

The plastic interlayer sheet 4 has an exterior interlayer face 40 that is oriented toward the interlayer face 32 and that here makes contact with this interlayer face 32, an interior interlayer face 42 that is oriented toward the interlayer face 50 and that here makes contact with this interlayer face 50, and an edge face 41 that is located between these two interlayer faces 32, 42.

In the figures, the glass sheets are each illustrated with a rounded edge face 31, 51; however these edge faces may be straight (vertical), with the edges between the edge faces and the faces then making right angles.

The glazed element 2 thus has an exterior face formed by the exterior face 30 of the exterior glass sheet 3, an interior face formed by the interior face 52 of the interior glass sheet 5 and an edge face located between these two faces, corresponding to the edge face 31 of the exterior glass sheet 3, to the edge face 41 of the plastic sheet 4 and to the edge face 51 of the interior glass sheet 5, the edge faces of the two glass sheets here being shifted horizontally from one another in the zone in question, while being separated vertically by a space corresponding to the thickness of the plastic sheet 4.

The periphery of the interior glass sheet 5 thus presents in the location seen in cross section an indent.

The glazing 1 is intended to be adhesively bonded to a rabbet of the coachwork using a bead adhesive (not illustrated) that is located between the interior face 52 of the interior glass sheet and an adjacent portion of the rabbet.

The glazing 1 includes, apart from the glazed element 2, at least one light-emitting diode 20 that is located in a particular zone of the glazing: in a zone of the glazed element in which the edge face 51 of the interior glass sheet is shifted more toward the center of the glazed element than the edge face 31 of the exterior glass sheet, i.e. in the zone of the indent.

Furthermore, in this zone, it is possible for the edge face 41 of the interlayer sheet to be aligned with the edge face 51 of the interior glass sheet, or even for the edge face 41 of the interlayer sheet to be shifted toward the center of the glazed element with respect to the edge face 51 of the interior glass sheet 5.

The light-emitting diode 20 is located under a peripheral edge of the interlayer face 32 of the exterior glass sheet 3 and includes an emitting face 21 located facing at least a part of the edge face 51 of the interior glass sheet 5 in order to emit light into this interior glass sheet 5 via its edge face 51.

According to the invention, the glazing 1 includes a profiled bead 6 including:
  an exterior lip 63 in contact with the peripheral edge of the interlayer face 32 of the exterior glass sheet 3 and/or the edge face 31 of the exterior glass sheet 3,
  an interior lip 65 in contact with a peripheral edge of the interior face 52 of the interior glass sheet 5, and
  a body 64 located between the exterior lip 63 and the interior lip 65,
with the body 64 located a distance away from the emitting face 21 of the light-emitting diode 20 and not in contact with this emitting face 21; the body 64 is located a distance away from the entirety of the light-emitting diode 20 and does not make contact with this light-emitting diode 20, in order to create a space S that is devoid of solid material.

The profiled bead 6 thus has an exterior face 60 that is oriented so as to face the interior faces 22 and 52 of the glass sheets and an interior face 62 that is located opposite the exterior face. The exterior face 60 is oriented toward the exterior E; the interior face 62 is oriented toward the interior I.

In FIGS. 1 and 2, the exterior lip 63 makes contact both with the peripheral edge of the interlayer face 32 of said exterior glass sheet 3 and the edge face 31 of the exterior glass sheet 3 in order to allow a seal tightness that is as high as possible with respect to fluids to be obtained, in order to protect the light-emitting diode 20.

Furthermore, in FIGS. 1 and 2 the body 64 is located a distance away from and does not make contact with the edge face 51 of the interior glass sheet 5, in order to create a space S that is large enough to insulate the body 64 from the heat emitted by the light-emitting diode 20.

The absence of contact between the light-emitting diode 20 and the entirety of the exterior face 60 located facing it may be clearly seen in the figures.

The body 64 thus has a width 164 that is equal to the distance by which the edge face 51 of the interior glass sheet is shifted toward the center of the glazed element, with respect to the edge face 31 of the exterior glass sheet, in the zone in which the light-emitting diode is present. This width $l_{64}$ is preferably comprised between 5.0 and 50.0 mm, and is for example 10.0 mm.

The exterior lip 63 has a width 163, in contact with the exterior glass sheet 3, that is preferably comprised between 1.0 and 5.0 mm and is, for example, 3.0 mm.

The interior lip 65 has a width $l_{65}$ that extends from the edge face 51 of the interior glass sheet in the direction of the center of the glazed element, which is preferably comprised between 1.0 and 50.0 mm and is, for example, 5.0 mm.

The body 64 has a height $h_{64}$ that is equal to the height between the interior face 23 of the light-emitting diode and the interior face 52 of the interior glass sheet. This height $h_{64}$ is smaller than the thickness of the interior glass sheet 5; for example, when the thickness of the interior glass sheet is 2.0 mm, the height $h_{64}$ is smaller than 2.0 mm. It may for example be about half the thickness of the interior glass sheet.

The exterior lip 63 has a height $h_{63}$, which is measured from the interior face 23 of the light-emitting diode and in the direction of the exterior; this height is:
  at minium equal to the thickness of the light-emitting diode 20 when the exterior lip 63 makes contact with the peripheral edge of the interlayer face 32 of the exterior glass sheet 3; this height is equal to the thickness of the light-emitting diode 20 when the exterior lip 63 makes contact only with the peripheral edge of the interlayer face 32 of the exterior glass sheet 3 without in contact with the edge face 31 of the exterior glass sheet 3; and
  at minium equal in addition to half the thickness of the exterior glass sheet 3 when the exterior lip 63 makes contact with the edge face 31 of this exterior glass sheet 3; for example, when the thickness of the exterior glass sheet is 2.0 mm, a minimum height of 1.0 mm is required in addition to the thickness mentioned in the first point.

The interior lip 65 has a height $h_{65}$ that extends from the interior face 52 of the interior glass sheet in the direction of the interior, which is preferably comprised between 1.0 and 5.0 mm and is, for example, 3.0 mm.

The light-emitting diode 20 is located in the zone in which the edge face 51 of the interior glass sheet is more toward the center of the glazed element than the edge face 31 of the exterior glass sheet. It is thus located more toward the center of the glazed element than the exterior flange 63. It is attached to the peripheral edge of said interlayer face 32 of the exterior glass sheet 3 by means of an adhesive layer 22.

This adhesive layer 22 has a thickness smaller than that of the interlayer sheet 4. As the edge face 41 of the interlayer sheet is shifted toward the center of the glazed element with respect to the edge face 51 of the interior glass sheet 5, this adhesive layer 22 may extend between the two glass sheets 3, 5, in proximity to the interlayer sheet, in the gap left by the interlayer sheet.

Preferably the body 64 is located a distance away from this adhesive layer 22 and does not make contact with this adhesive layer.

Furthermore, the exterior lip 63 is preferably located a distance away from this adhesive layer 22 and does not make contact therewith.

The interior lip 65 preferably does not lie against the edge face 51 of said interior glass sheet 5 in order that a maximum of light emitted by the light-emitting diode 20 penetrates into the interior glass sheet via this edge face 51.

It is possible for the interior lip 65 to make contact with the peripheral edge of the interior face 52 of said interior glass sheet 5 over only a part of the length of the interior lip 65.

Thus, it is possible to produce a recess in the thickness of the interior lip 65 such that the interior lip does not make contact with the ridge located between the edge face 51 and the interior face 52.

To manufacture the profiled bead 6, it is proposed that it be positioned by extruding a constituent material of the profiled bead directly onto the glazed element, after the latter has been produced (after the lamination).

It is then possible to produce the profiled bead 6 such that the body 64 is located a distance away from, and not in contact with, the light-emitting diode 20.

Furthermore, it is possible for the profiled bead 6 to be a distance away from and to not make contact with the edge face 51 of the interior glass sheet 5.

It is moreover possible for the profiled bead 6 to be a distance away from and to not make contact with the interior face 32 of the exterior glass sheet 3.

The constituent polymer of the profiled bead 6 may be a thermoplastic (PVC, TPE, etc.), a polyurethane or even a synthetic rubber such as EPDM or any other suitable material.

FIG. 2 illustrates one variant embodiment in which the profiled bead 6 furthermore includes an additional protective profile 7 that is located more toward the interior than said profiled bead 6.

The interior face 62 of the profiled bead 6 is thus at least partially and even, as here, completely covered by the additional protective profile 7.

This additional protective profile 7 is, preferably, manufactured not by extrusion but by encapsulation of the profiled bead 6.

To do this, the process for manufacturing the glazing 1 includes a step of molding the additional protective profile 7 in a molding device, between two molding elements, one molding element accommodating the interior face of the glazing and one molding element accommodating the exterior face of the glazing, these two molding elements being closed onto each other during the molding step while leaving therebetween a molding cavity that is filled with the constituent material of the additional protective profile in the step of molding this additional protective profile.

The additional protective profile 7 preferably completely covers the profiled bead 6. It thus makes contact with the interior face 52 of the interior glass sheet and contact with the edge face 31 and/or the exterior face 30 of the exterior glass sheet 3.

In FIG. 2, the illustrated additional protective profile 7 is aligned (flush) with the exterior face 30 and does not protrude above this exterior face 30 or make contact with this exterior face.

The constituent polymer of the additional protective profile 7 is different from the constituent material of the profiled bead; the additional protective profile 7 may for example be made of polyurethane or of polyvinyl chloride.

Depending on the materials used, it is possible for the profiled bead 6 and the additional protective profile 7 to adhere.

The present invention is applicable to any glazing and in particular to any fixed automotive glazing. It may also be applied to any edge of such a glazing: left-hand edge, right-hand edge, top edge or bottom edge, and in particular to a plurality of or even all these edges at the same time.

The invention claimed is:

1. A glazing, comprising a laminated glazed element comprising an exterior glass sheet, an interior glass sheet and a plastic interlayer sheet that is located between said exterior and interior glass sheets,
   said exterior glass sheet having an exterior face, an edge face and an interlayer face that is oriented toward said plastic interlayer sheet,
   said interior glass sheet having an interlayer face that is oriented toward said plastic interlayer sheet, an edge face and an interior face,
   said glazing including at least one light-emitting diode located under a peripheral edge of said interlayer face of said exterior glass sheet and having an emitting face,
   wherein said emitting face is located facing at least a part of said edge face of said interior glass sheet and wherein the glazing includes a profiled bead including
      an exterior lip in contact with said peripheral edge of said interlayer face of said exterior glass sheet and/or said edge face of said exterior glass sheet,
      an interior lip in contact with a peripheral edge of said interior face of said interior glass sheet, and
      a body located between, and connecting, said exterior lip and said interior lip,
   with said body being located a distance away from the entirety of the light-emitting diode and not in contact with said light-emitting diode; wherein said light-emitting diode is attached to said peripheral edge of said interlayer face of said exterior glass sheet with an adhesive layer, said body being located a distance away from, and not in contact with said adhesive layer.

2. The glazing as claimed in claim 1, wherein said interior lip does not lie against said edge face of said interior glass sheet.

3. The glazing as claimed in claim 1, wherein said interior lip is in contact with said peripheral edge of said interior face of said interior glass sheet over only a part of its length.

4. The glazing as claimed in claim 1, wherein said exterior lip has a width comprised between 1.0 and 3.0 mm and a height comprised between 1.0 and 5.0 mm.

5. The glazing as claimed in claim 1, wherein said interior lip has a width comprised between 1.0 and 10.0 mm and a height comprised between 1.0 and 3.0 mm.

6. The glazing as claimed in claim 1, further comprising an additional protective profile that at least partially covers an interior face of said profiled bead, the interior face of said profiled bead being the face furthest away from said light-emitting diode.

7. A process for manufacturing a glazing as claimed in claim 1, comprising positioning said profiled bead, by extruding a constituent material of said profiled bead, with said body located a distance away from said emitting face of the light-emitting diode and not in contact with said emitting face.

8. The process as claimed in claim 7, further comprising manufacturing an additional protective profile by encapsulating said profiled bead.

9. The glazing as claimed in claim 1, wherein the glazing is an automotive glazing.

10. The glazing as claimed in claim 1, wherein said body is located a distance away from, and not in contact with, said edge face of said interior glass sheet.

11. The glazing as claimed in claim 1, wherein and said exterior lip is located a distance away from, and not in contact with, said adhesive layer.

12. The glazing as claimed in claim 6, wherein the additional protective profile completely covers the interior face of said profiled bead.

13. The process as claimed in claim 7, wherein the body is located a distance away from, and not in contact with, said edge face of said interior glass sheet.

14. The glazing as claimed in claim 1, wherein said profiled bead is a one-piece element.

15. The glazing as claimed in claim 1, wherein said body includes a first interior face that is oriented so as to face the interlayer face of the exterior glass sheet and to face the interior face of the interior glass sheet, and a first exterior face, said first exterior face being opposite the first interior face, and wherein the first interior face is out of contact with the interlayer face of the exterior glass sheet and with the interior face of the interior glass sheet.

\* \* \* \* \*